UNITED STATES PATENT OFFICE.

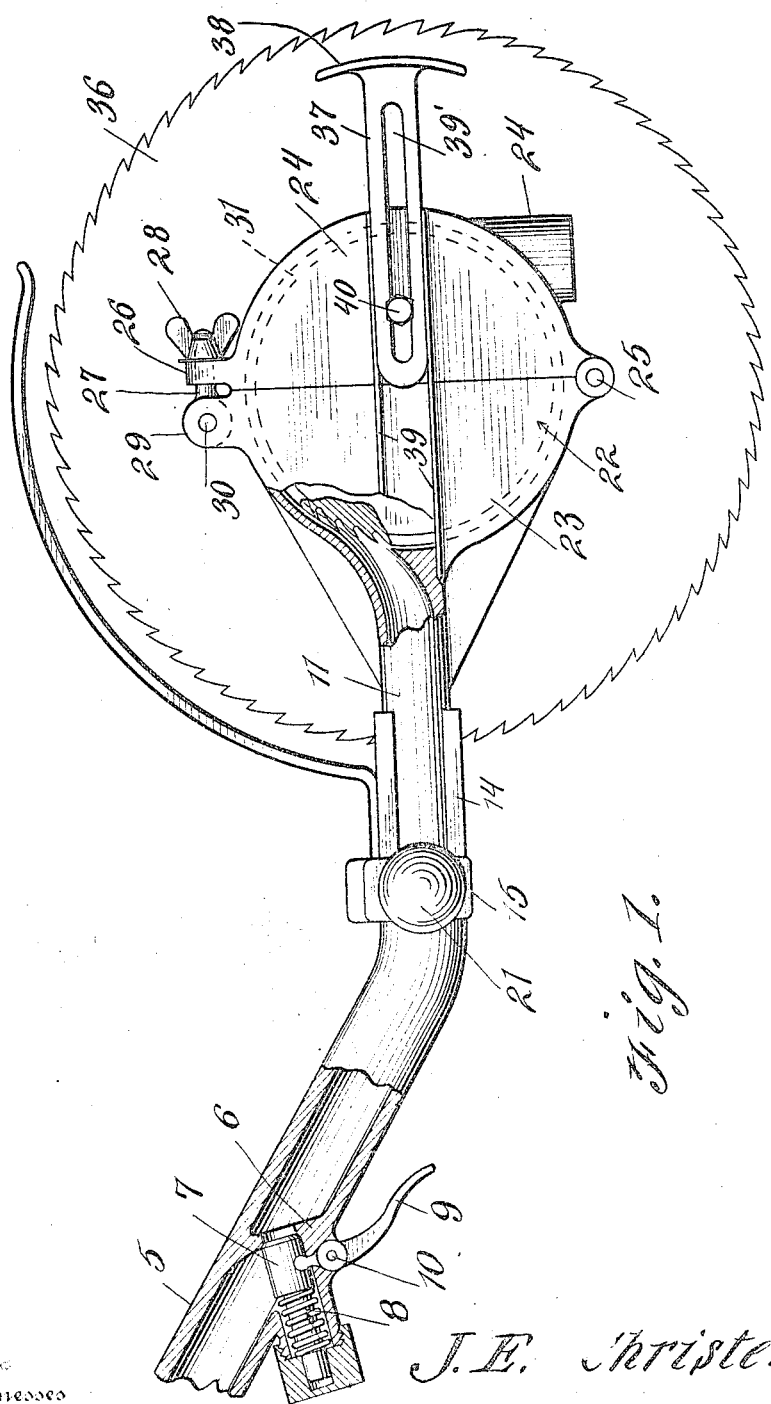

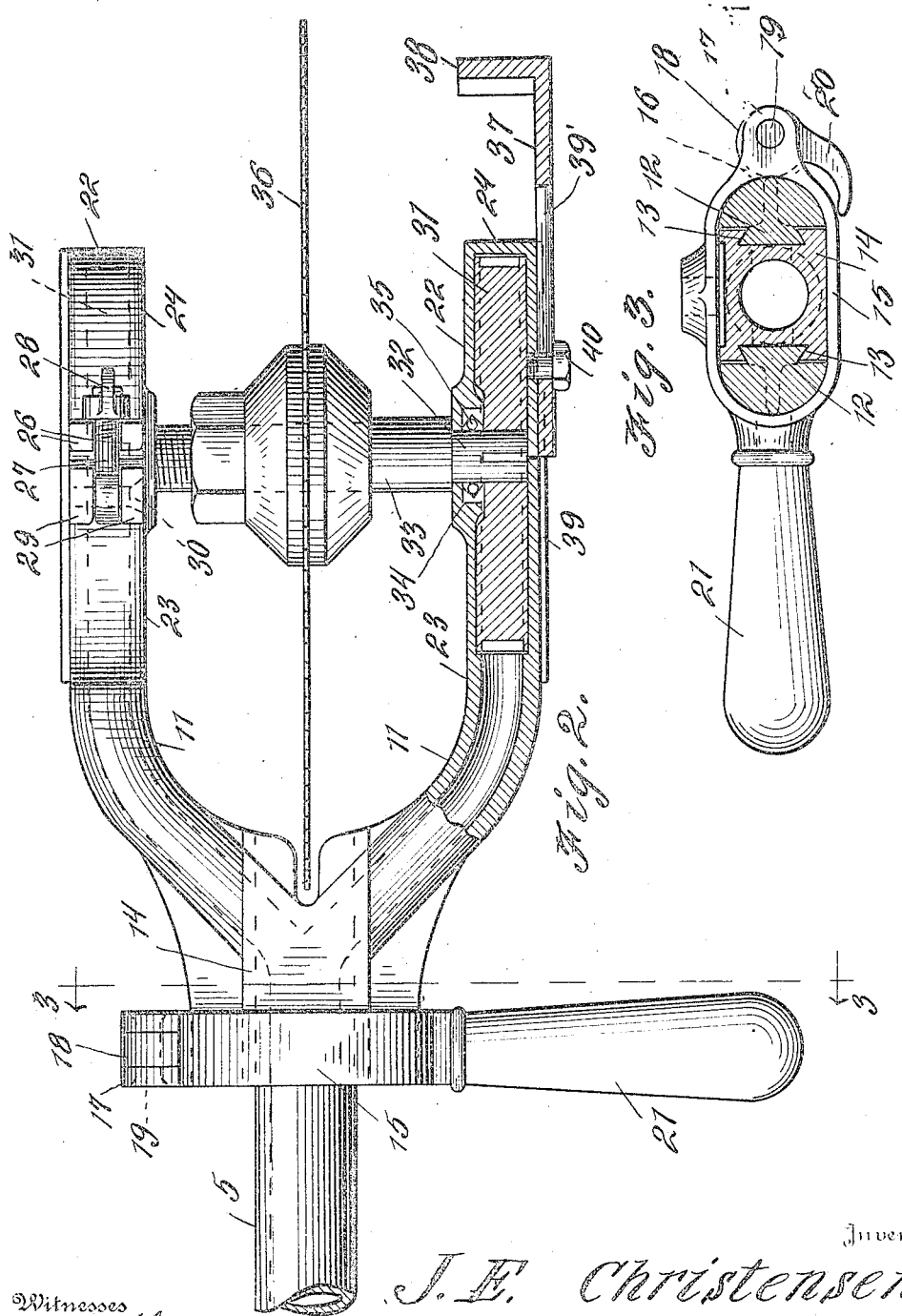

JOHANNES EMIL CHRISTENSEN, OF EVERETT, WASHINGTON.

ROTARY ENGINE.

1,140,952.  Specification of Letters Patent.  Patented May 25, 1915.

Application filed January 2, 1915. Serial No. 302.

*To all whom it may concern:*

Be it known that I, JOHANNES EMIL CHRISTENSEN, a subject of the King of Denmark, residing at Everett, in the county of Snohomish and State of Washington, have invented certain new and useful Improvements in Rotary Engines, of which the following is a specification.

My invention relates to improvements in fluid pressure operated rotary engines or turbines, adapted for driving a rotatable cutting element, while not necessarily restricted to such use.

An important object of the invention is to provide apparatus of the above mentioned character, which has its operating parts so disposed that the same are balanced, more or less, whereby the apparatus may be conveniently bodily moved or handled by a single operator.

A further object of the invention is to provide apparatus of the above mentioned character, which is simple in construction, light, durable, and inexpensive to manufacture.

A further object of the invention is to provide apparatus of the above mentioned character, formed of few and simple parts which may be readily detached and assembled, for the purpose of shipment and use, respectively.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, parts being shown in section, Fig. 2 is a plan view of the same, parts being shown in section, and, Fig. 3 is a transverse sectional view taken on line 3—3 of Fig. 2.

In the drawings, wherein for the purpose of illustration is shown a preferred embodiment of my invention, the numeral 5 designates a tubular handle, having connection with a flexible hose or the like (not shown) through which is supplied fluid pressure, such as compressed air or steam. This tubular handle is provided with a valve structure 6, comprising a movable valve 7, normally held in the closed position by a spring 8, and adapted to be opened by a hand lever 9. This hand lever is pivoted at 10 with the handle 5 and is arranged near and extends longitudinally of the handle to be conveniently manipulated by the hand of the operator which is grasping the tubular handle. The frame of the apparatus comprises spaced tubular arms 11, which converge rearwardly, and engage upon opposite sides of the tubular handle 5 with their bores in free communication with the bores of the tubular handle, as more clearly shown in Figs. 2 and 3. The tubular arms 11 are provided upon their inner sides with preferably dove-tail lugs 12, fitting within dove-tail grooves 13, formed upon the opposite sides of a portion 14 of the tubular handle 5, such portion being preferably formed square in cross-section, as clearly illustrated in Fig. 3. In this manner, the tubular arms 11 are securely attached to the tubular handle and may be removed therefrom, when it is desired to separate the several parts of the apparatus and pack the same in a small space, for the purpose of shipment. Means are provided to clamp the ends of the tubular arms 11 to the portion 14 of the handle 5, for preventing longitudinal movement of the arms 11 with relation to the handle 5, comprising a preferably loop-shaped open frame 15, adapted to be conveniently passed over the ends of the tubular arms 11 and the portion 14. At one end, this clamping frame 15 is provided with an opening 16, and carries spaced knuckles 17, receiving therebetween a locking cam 18, having pivotal connection therewith by means of a pintle 19. A lever or finger 20 is secured to the locking cam to move the same to the active and inactive positions. Rigidly connected with the opposite end of the clamping frame 15 is a handle or hand grip 21, by means of which the apparatus may be conveniently handled. From the foregoing description it is obvious that the handle 21, tubular handle 5, and tubular arms 11 may all be readily separated for the purpose of shipment. Carried by the forward end of each tubular handle 11 is a turbine casing 22, comprising a rear preferably semi-cylindrical casing-section 23, rigidly connected and preferably cast integral with the tubular arm 11.

The numeral 24 designates a co-acting preferably semi-cylindrical casing-section, hinged preferably at its lower end with the casing-section 23, as shown at 25. The casing-section 24 is provided, preferably at its upper end, with spaced lugs 26, receiving therebetween a bolt 27, carrying a winged clamping nut 28. The bolt 23 has its rear end arranged between spaced lugs 29 carried by the casing-section 23 and pivoted thereto by means of a pintle 30, as shown. It is obvious that by proper manipulation of the thumb nut 28, the casing-section 24 may be swung forwardly and downwardly with respect to the casing-section 23. The bore of the tubular arm 11 has free communication with the interior of the casing-section 23 and the casing-section 24 has an exhaust port or conduit 24'.

Rotatably and removably mounted within the turbine casings 22 are turbine rotors 31, removably mounted upon reduced ends 32 of a transverse shaft 33, but incapable of rotating with relation thereto whereby the rotation of the turbine rotors effects a corresponding rotation of the shafts 33. The inner sides of the turbine casing 22 are provided with bearing-boxes 34, formed in semi-cylindrical parts, whereby the same are opened when the turbine casings 24 are swung forwardly. Ball-bearings 35 are held within the bearing-boxes 34 and rotatably receive and hold the shaft 33. The shaft 33 has a rotatable cutting element 36 removably and rigidly connected therewith. I have shown this rotatable cutting element in the form of a wood saw, but it is not desired to restrict the invention to any particular type of rotatable cutting element, as a wood plane, an iron cutting saw, and other rotatable cutting elements may be connected therewith, and operated thereby.

As more clearly shown in Figs. 1 and 2, the numeral 37 designates a longitudinally adjustable guide or gage, provided at its forward end with a curved transverse head 38. This guide operates between spaced longitudinal flanges 39 formed upon the casing-sections 23 and 24 and is provided with a longitudinal slot 39', receiving a clamping bolt 40, attached to the casing section 24. It is obvious that by proper manipulation of the bolt 40, the guide or gage 37 may be longitudinally adjusted with respect to the casing-section 23 and locked in adjustment at the desired longitudinal position.

The operation of the apparatus is as follows:—The operator preferably holds the tubular handle 5 in the left hand while the hand grip 27 is held in the right hand, thus enabling the apparatus to be readily shifted or moved from one position to the other. The disposition of the turbines upon opposite sides of the rotatable cutter, serve to evenly distribute the weight of the apparatus so that the same is balanced and is more convenient to handle. The lever 9 may be conveniently swung toward the tubular handle by pressure of the finger or fingers thereon, whereby the fluid pressure such as compressed air or steam, is fed through the tubular arms 11 into the casings 22, whereby the turbine rotors 21 are driven, the same preferably rotating clockwise. The apparatus is preferably held in a position to retain the guide 37 at substantially a right angle to the board or plank to be cut. The guide head 38 slidably engages the plank, regulating the depth that the saw will cut. As above indicated, the parts of the apparatus are readily detachable for the purpose of shipment. By moving the casing-sections 24 to the open position the turbine rotors 31 may be readily removed therefrom, subsequently to which they may be removed from the shaft 33. A different rotatable cutter such as a plane or iron cutting saw may now be applied to this shaft and the turbine rotors 31 again secured to the shaft. The turbine rotors are returned to the position within the casing-sections 23 and the casing-sections 24 moved to the closed position and locked therein.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim is:—

1. In an engine of the character described, a handle carrying spaced arms, turbine casings secured to the arms, turbine rotors disposed within the casings, a transverse shaft disposed between the spaced arms and secured to the rotors, a rotatable element carried by the transverse shaft, and means for supplying fluid pressure to the turbine casings.

2. In an engine of the character described, a tubular handle carrying spaced tubular arms, turbine casings secured to the spaced tubular arms and receiving fluid pressure therefrom, a rotatable transverse shaft arranged between the spaced tubular arms, rotors arranged within the casings and connected with the transverse shaft to drive the same, and a rotatable element disposed between the tubular arms and mounted upon the transverse shaft to be driven thereby.

3. In an engine of the character described, a handle carrying spaced tubular arms, turbine casings secured to the spaced tubular arms and receiving fluid pressure therefrom, turbine rotors arranged within the casings, a transverse shaft disposed between the tubular arms and connected with the rotors, and a rotatable element connected with the transverse shaft.

4. In an engine of the character described, a tubular handle, spaced tubular arms having detachable engagement with the tubular handle, a transverse handle carrying detachable clamping means receiving and holding the tubular handle and spaced tubular arms together, turbine casings carried by the tubular arms, rotors arranged within the casings, a transverse shaft disposed between the tubular arms and connected with the rotors, and a rotatable element arranged between the tubular arms and carried by the shaft.

5. In an engine of the character described, a tubular handle, spaced tubular arms having tongue and groove connection with the tubular handle, a handle carrying frame receiving portions of the tubular handle and tubular arms, an adjustable clamping member carried by the frame to engage one tubular handle, turbine casings carried by the tubular arms, rotors arranged within the casings, a transverse shaft arranged between and connected with the rotors, and a rotatable element carried by the shaft.

6. In an engine of the character described, a tubular handle, spaced tubular arms having detachable connection therewith, a turbine casing carried by each tubular arm and including relatively movable casing-sections, rotors arranged within the turbine casings, a transverse shaft carried by the rotors, and a rotatable element secured upon the shaft.

7. In an engine of the character described, a substantially V-shaped tubular frame, turbine casings carried by the arms of the frame, a transverse shaft arranged between the turbine casings, rotors disposed within the casings and connected with the shaft, a rotatable element secured upon the shaft, and a guide member longitudinally adjustably mounted upon one turbine casing.

In testimony whereof I affix my signature in presence of two witnesses.

JOHANNES EMIL CHRISTENSEN.

Witnesses:
L. A. MERRICK,
J. C. STRAND.